United States Patent
Thompson et al.

(10) Patent No.: US 8,280,658 B2
(45) Date of Patent: Oct. 2, 2012

(54) SYSTEM FOR MONITORING EXPOSURE TO VIBRATION

(75) Inventors: Martin Thompson, Histon (GB); Mark Lucien Harper, Cambridge (GB)

(73) Assignee: Havsco Limited, Knebworth (GB)

( * ) Notice: Subject to any disclaimer, the term of this patent is extended or adjusted under 35 U.S.C. 154(b) by 379 days.

(21) Appl. No.: 12/663,293

(22) PCT Filed: Apr. 30, 2008

(86) PCT No.: PCT/GB2008/050314
§ 371 (c)(1),
(2), (4) Date: Dec. 7, 2009

(87) PCT Pub. No.: WO2008/149130
PCT Pub. Date: Dec. 11, 2008

(65) Prior Publication Data
US 2010/0174502 A1     Jul. 8, 2010

(30) Foreign Application Priority Data

| Jun. 7, 2007 | (GB) | 0710943.2 |
| Jun. 7, 2007 | (GB) | 0710946.5 |
| Jul. 23, 2007 | (GB) | 0714296.1 |

(51) Int. Cl.
*G01R 31/36* (2006.01)

(52) U.S. Cl. ......................................................... 702/63

(58) Field of Classification Search ..................... 702/63
See application file for complete search history.

(56) References Cited

U.S. PATENT DOCUMENTS 6,490,929 B1   12/2002   Russell et al.
6,567,006 B1    5/2003   Lander et al.
(Continued)

FOREIGN PATENT DOCUMENTS
EP    1586875 A1    10/2005
(Continued)

OTHER PUBLICATIONS

International Preliminary Report on Patentability, published Dec. 7, 2009 for PCT/GB2008/050314, filed Apr. 30, 2008.
(Continued)

*Primary Examiner* — Tung S Lau
(74) *Attorney, Agent, or Firm* — Martin Fleit; Paul D. Bianco; Fleit Gibbons Gutman Bongini & Bianco PL

(57) ABSTRACT

A portable instrument, described in GB2413189, is held between the fingers of one hand and measures the cumulative exposure of a worker to vibration. However, this instrument will not comfortably fit the hands of all workers There is also an administrative problem in administering the allocation of different instruments to respective workers at the beginning of a shift, recording the measurements at the end of a shift and ensuring that instruments are adequately charged. The problem is solved by using a docking station (14) to receive the instruments before and after use, to receive information recorded by or stored within the units, to charge the batteries and to receive identity information concerning a worker requesting access, to a unit. When a worker returns an instrument to the docking station, a processing mechanism collects information about the identity of the worker, and the state of charge of the instrument's battery. It also informs a worker about to start work which instrument to take and records which worker has or has had which instrument.

9 Claims, 10 Drawing Sheets

U.S. PATENT DOCUMENTS

2007/0052615 A1* 3/2007 Van Dongen et al. ......... 345/1.1
2009/0091465 A1 4/2009 Buckingham et al.

FOREIGN PATENT DOCUMENTS

| | | | |
|---|---|---|---|
| EP | 1 645 230 | A2 | 4/2006 |
| GB | 2 299 169 | A | 9/1996 |
| GB | 2 413 189 | A | 10/2005 |
| WO | 2007/072068 | A2 | 6/2007 |

OTHER PUBLICATIONS

Written Opinion published Dec. 7, 2009 for PCT/GB2008/050314, filed Apr. 30, 2008.
International Search Report published Nov. 12, 2008 for PCT/GB2008/050314 filed Apr. 30, 2008.

* cited by examiner

[Fig. 001]
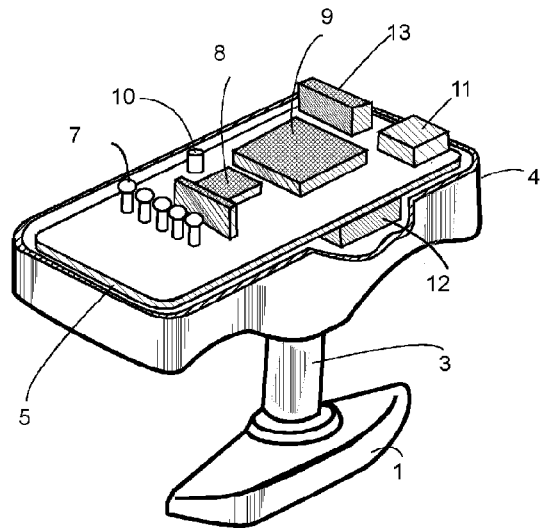
[Fig. 002]
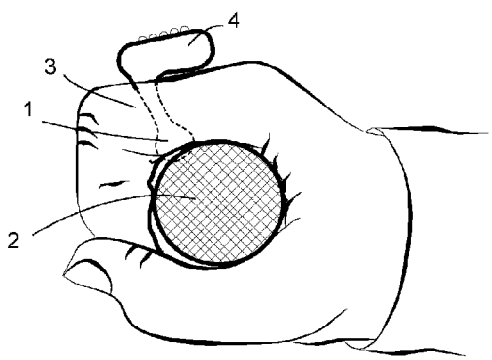
[Fig. 003]
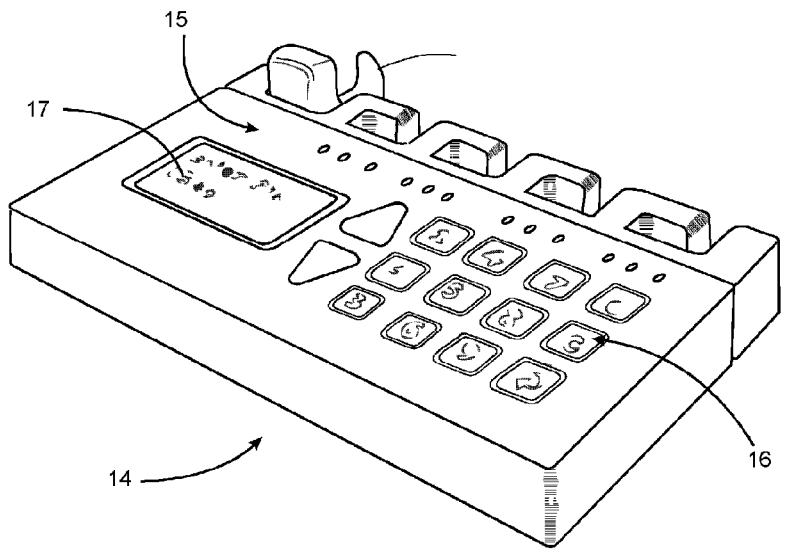

[Fig. 004]
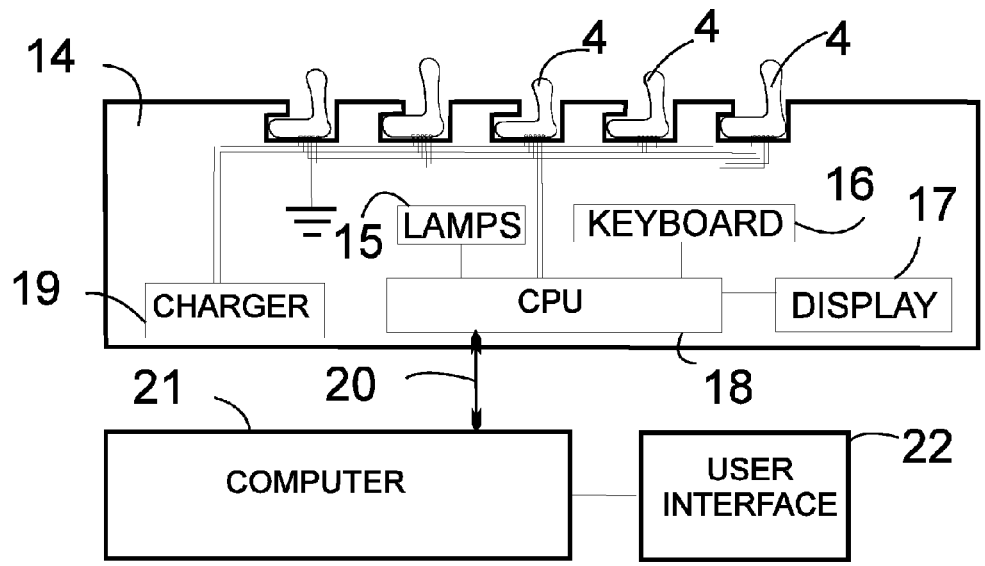
[Fig. 005]
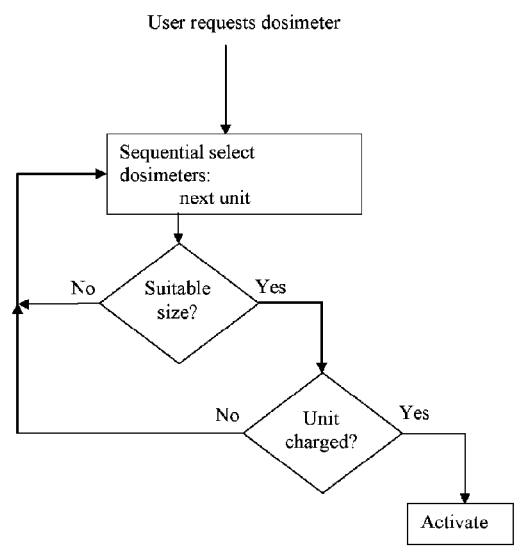

[Fig. 006]
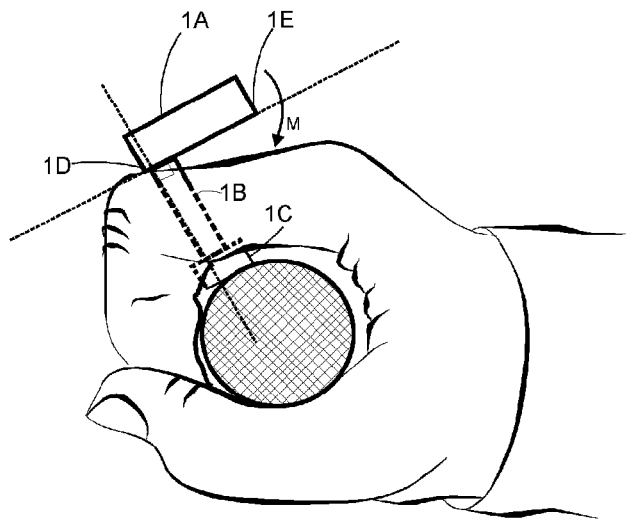
[Fig. 007]
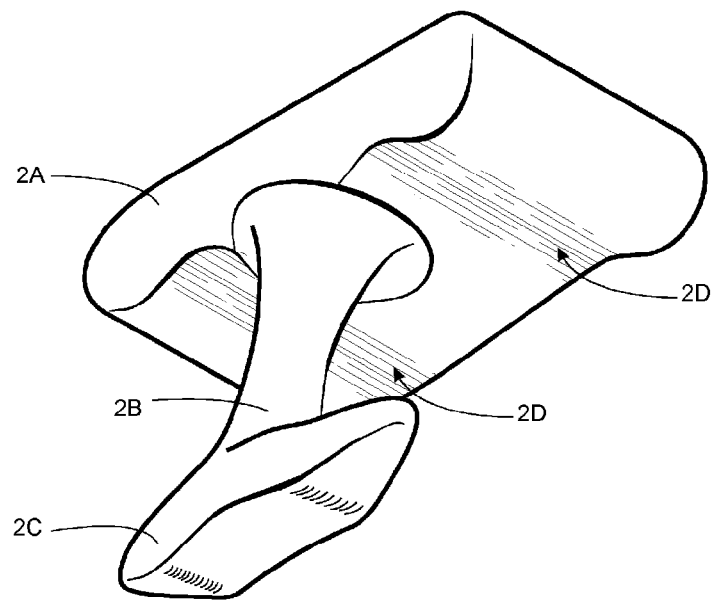

[Fig. 008]
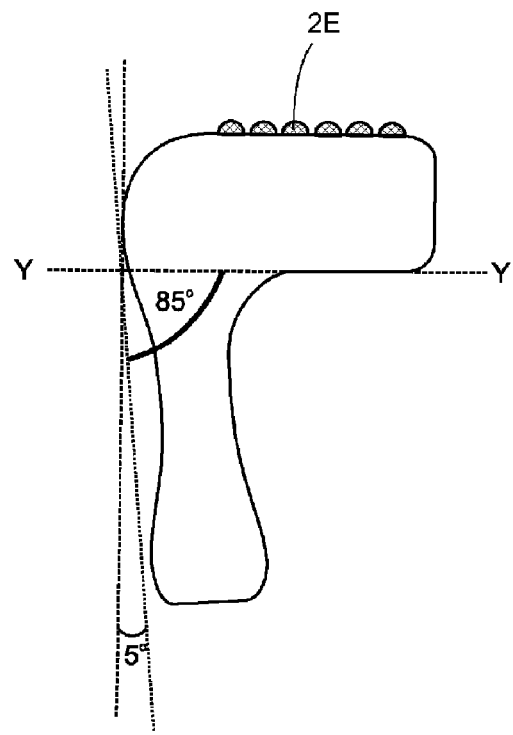
[Fig. 009]
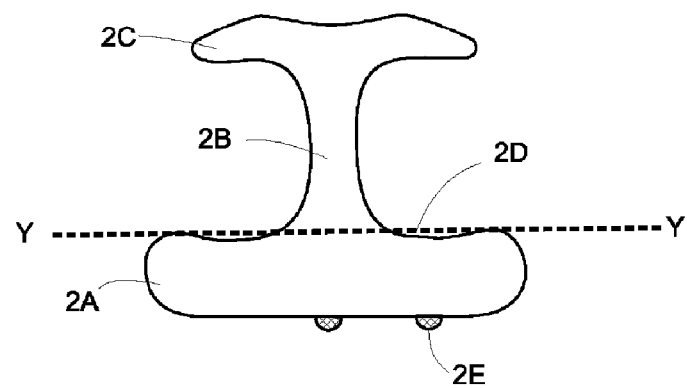

[Fig. 010]
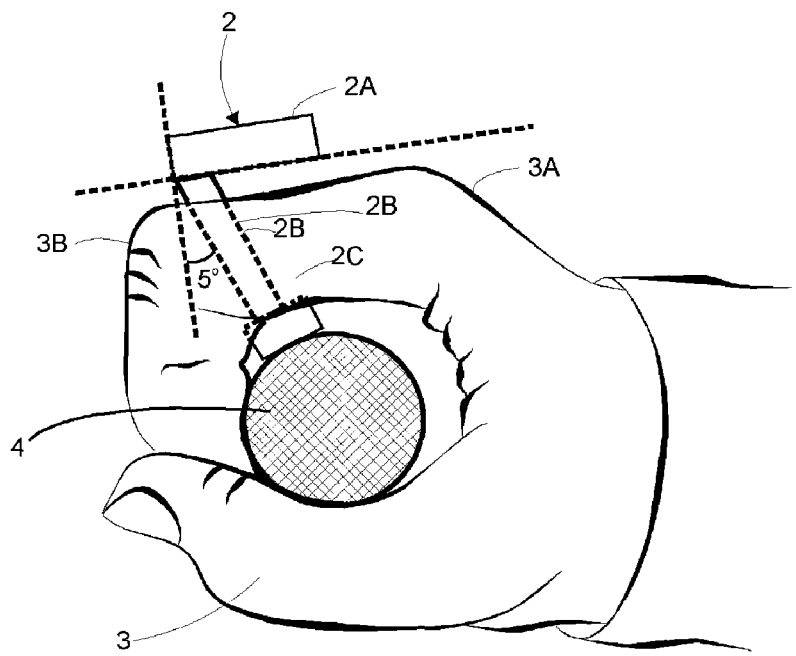
[Fig. 011]
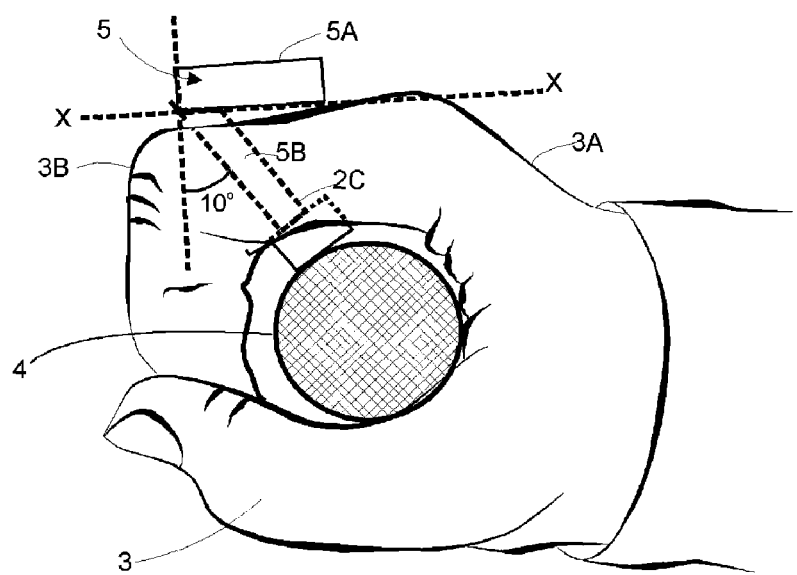

[Fig. 012]
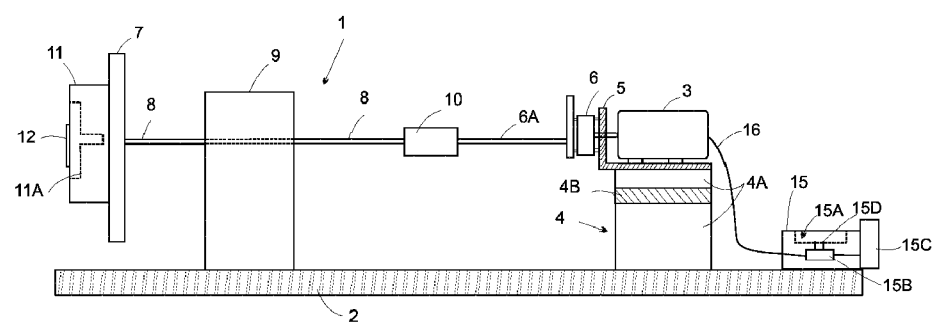
[Fig. 013]
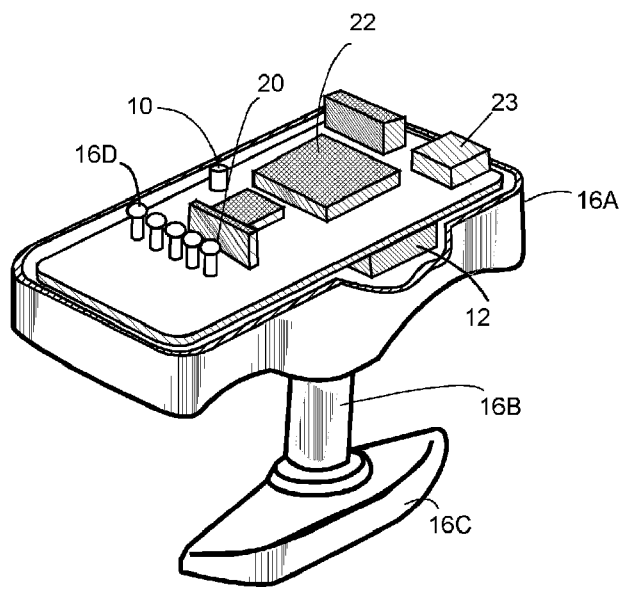

[Fig. 014]
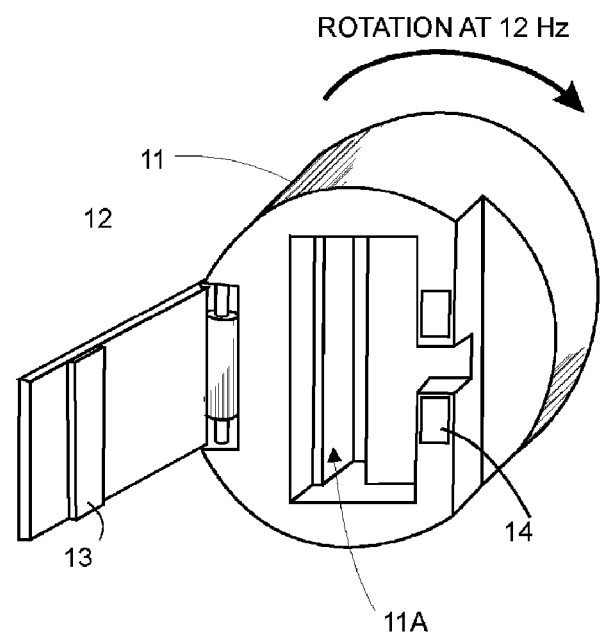
[Fig. 015]
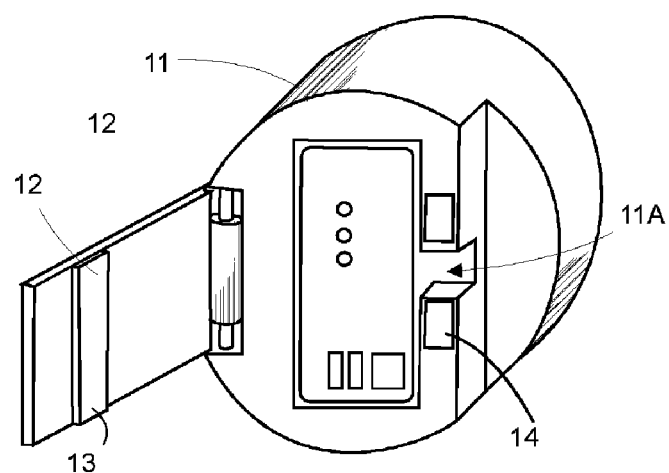

[Fig. 016]
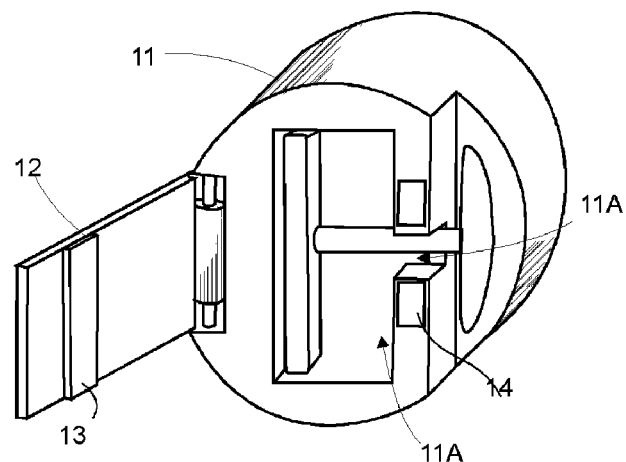
[Fig. 017]
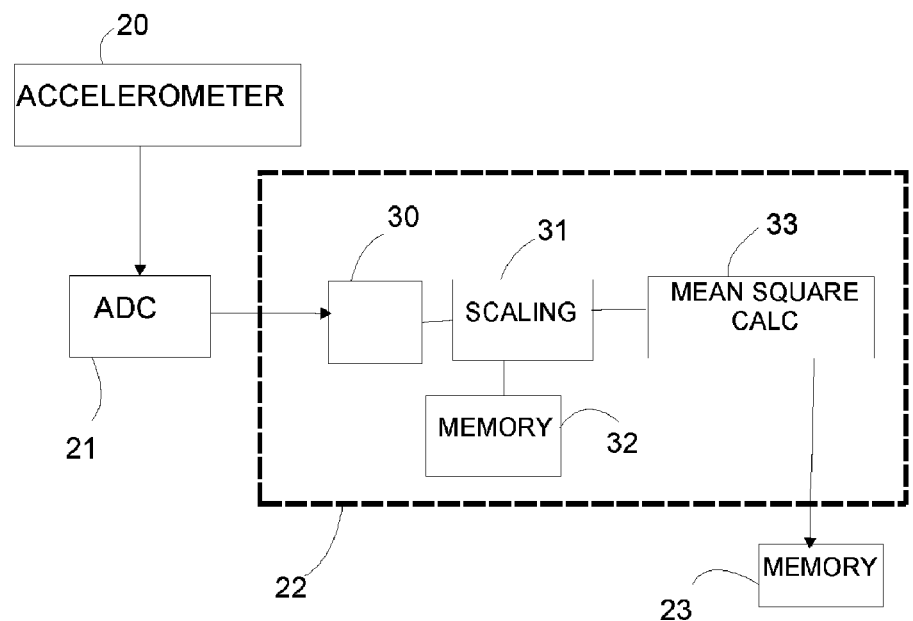

[Fig. 018]
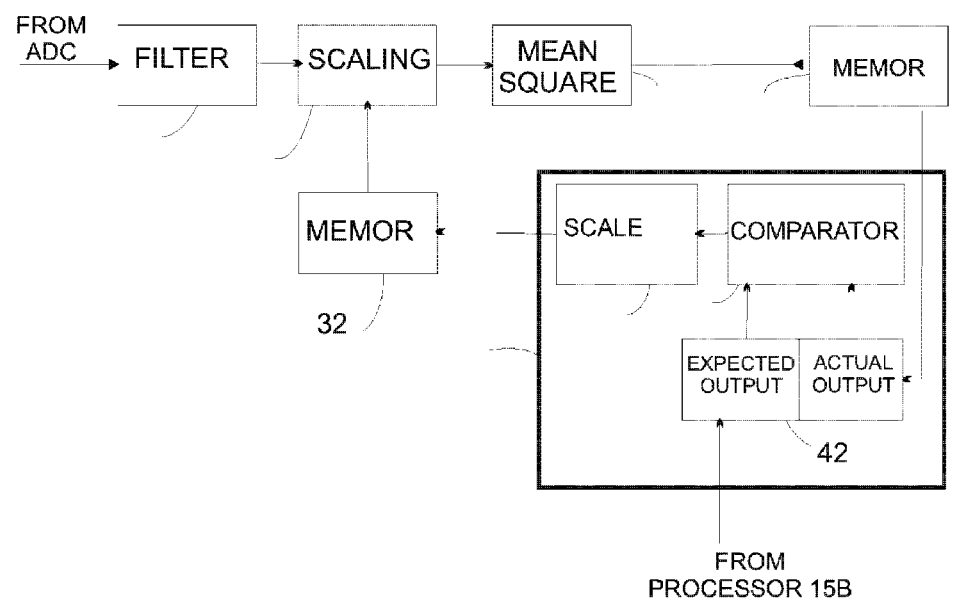

[Fig. 019]

| TABLE 1 ||
|---|---|
| USER ID | DOSIMETER IDENTITY |
| 1342 | #i2 |
| 3846 | #i1 |
| 2394 | #i4 |
| 2047 | #i3 |

| TABLE 2 ||
|---|---|
| USER ID | STEM (mm) |
| 3498 | 19 |
| 1934 | 22 |
| 4964 | 22 |
| 7693 | 21 |

SYSTEM FOR MONITORING EXPOSURE TO VIBRATION

FIELD OF THE INVENTION

This invention relates to a system for monitoring exposure of a person to vibration when using vibrating equipment.

BACKGROUND OF THE INVENTION

Excessive exposure to vibration is known to cause a health problem known as "white finger" that causes numbness and pain and, for this reason there is a European Directive that specifies the maximum exposure levels that are considered safe.

A battery powered instrument described in our patent specification GB2413189 is held between the fingers of one hand and measures the cumulative exposure of the user to vibration from equipment that the user is holding. Instruments for measuring cumulative vibration exposure will be referred to in this specification as 'dosimeters'. The dosimeter described in GB2413189 is convenient to use, accurate and reliable. However, there are some problems. Firstly, it has been found that it is important, for reasons of comfort, for the dosimeter to properly fit the user's hand. The fit needs to be sufficiently good that a single size of dosimeter cannot satisfactorily be used by all workers on a site. Secondly, on a site where there are many workers needing to use vibrating equipment, there is an administrative problem in assigning a dosimeter of the correct size, and that is known to be fully charged, to each worker before a work shift, collecting the dosimeter at the end of the shift, transferring the data on that dosimeter onto a computer in association with the identity of the worker, and then re-charging the dosimeter.

This invention resides partly in the recognition of the above problems and partly in the provision of a solution.

SUMMARY OF THE INVENTION

According to a first aspect of this invention there is provided a system for monitoring the exposure of users of vibrating equipment to vibration comprising:

a) battery powered portable units designed to fit on the hands of users and to record information concerning the exposure of the users to vibration;

b) a docking station designed to receive the portable units before and after use, to receive information recorded by or stored within the units, to charge the batteries and to receive identity information concerning a worker requesting access to a unit; and c) a processing mechanism associated with the docking station and arranged and programmed (i) to receive the said identity information and information concerning the state of charge of the batteries, (ii) to inform a user about to start work which unit to take and (iii) to record which worker has or has had which dosimeter.

The processing mechanism can be located in or separately from the docking station but, in a preferred construction, some of the processing capability is located within a casing of the docking station, the rest being provided by a suitably programmed general purpose computer connected by a wired or wireless communications link to the docking station.

The portable dosimeters are preferably different sizes and/or shapes to suit different hand sizes and shapes. The processing mechanism needs to have a record of the hand-type of each user so that a suitable dosimeter can be assigned to a user on entering his identity.

It is important that the processing mechanism should assign to a user a dosimeter that is fully charged or nearly so. In one arrangement, the system is programmed so that only fully charged dosimeters are automatically offered but where a record of the usage time since a unit was last fully charged is kept. With this information, where no fully charged dosimeters are available, a manual override facility allows a supervisor to allocate a dosimeter that is not fully charged but which has sufficient charge for the user's work shift. In an alternative arrangement this override facility could be performed automatically.

The docking station preferably defines a number of shaped recesses or other conformations, each capable of receiving any portable dosimeter and holding it in a location so that contacts on the dosimeter connect with corresponding contacts on the docking station.

Each portable dosimeter preferably has, in addition to a tri-axial accelerometer, a facility for storing a record of the accumulated exposure to vibration and preferably a warning device that can inform the user when a permissible exposure limit has been reached. During manufacture, these components can be positioned in an outer casing which is then filled with a settable compound, leaving exposed just the tips of certain conductors. These conductor tips define contacts for charging the battery and by which data can be transmitted at the docking station. In an alternative arrangement, charging can be performed inductively and data transfer wirelessly.

Although the invention arose when considering the monitoring of vibrational exposure, it is envisaged that the same principles may be more broadly applicable to the monitoring of users and their environment generally. Examples are the monitoring of pulse rate, body temperature; air or water temperature/pressure; exposure to particular frequencies of electromagnetic radiation, natural and synthetic chemicals or air borne particulates. In some circumstances it may be required to monitor a quantity that is a function of two or more such variables. For example, a vibration dose measurement could usefully be weighted by a temperature measurement since a user's susceptibility to vibration is known to be dependant on temperature. Thus, the first aspect of this invention can also be expressed as being a monitoring system comprising:

a) battery powered portable units designed to record information concerning a user and/or to make a measurement at a location of the user b) a docking station designed to receive the portable units before and after use, to receive information recorded by or stored within the units, to charge the batteries and to receive identity information concerning a worker requesting access to a unit; and c) a processing mechanism associated with the docking station and arranged and programmed (i) to receive the said identity information and information concerning the state of charge of the batteries, (ii) to inform a user about to start work which unit to take and (iii) to record which user has or has had which unit.

It is to be noted that the portable units may be equipped to monitor characteristics of the users such as their temperature or heart rate, and or of their environment and exposure to particular frequencies of electromagnetic radiation, natural and synthetic chemicals, air borne particulates etc.

A second aspect of the invention relates to handheld sensors particularly, but not exclusively, for sensing hand-arm vibration exposure.

Currently there are no cheap and easy-to-use personalised devices available to measure hand-arm vibration on a regular basis. Yet the EU legislation previously referred to requires the monitoring of such vibration on an increasing basis from 6 Jul. 2005 until complete implementation five years later.

The new Directive acknowledges the possible damaging consequences of vibration for human health and lays down maximum dosages of vibration exposure to avoid "white finger". White finger is a medical condition of numbness or pain that arises from continuous use of vibrating tools. In extreme cases white finger can lead to loss of one or more digits. The new Directive lays down a careful specification of what cumulative vibration dosage the user is allowed to be exposed to. Above this specified dosage, work must stop for that day. The Directive does not suggest how this exposure is to be measured. Technically, vibration measurements can be made with high quality expensive hardware that exists on the market today. This hardware will have been used in research work involved in the definition of the standards.

The device disclosed in EP1586875 resulted from endeavours to provide a vibration dosage meter that is light, unobtrusive, comfortable and easy to use even when wearing work gloves, sufficiently inexpensive to be given to every worker, calculates the vibration dosage accurately and provides a clear indication of when the dosage limit has been reached.

The device is formed in a cufflink shape having a stem section which fits between any pair of fingers and having a base which sits on the underside of the hand and makes contact with a handle of a machine which is being gripped by the user.

FIG. 6 illustrates a cross section of the device of EP1586875 whilst in use on a user's hand which is gripping onto a handle. The device has a main body 1A, stem 1B and foot 1C. During trials of the device it was found that although the body 1A would lie flush with the knuckles when the hand was held open, when the hand was clenched, the skin on the palm side of the adjacent fingers tended to act on the foot 1C causing the body 1A to be tilted at an angle from the middle phalanges (finger section between base and middle knuckle). This simultaneously caused the near edge 1D of the body 1A to be pressed into the top of the fingers.

Commonly, the operators are required to wear gloves (not shown) over the device and these tend to push down on the body 1A, imparting a turning moment, indicated by arrow M, which causes the foot 1C to slide and/or pivot against the handle of the machine and the back edge 1E of the body 1A to push down on the knuckles. This creates discomfort on both the over and undersides of the operator's hand. There is also the possibility that this might potentially affect the accuracy of the measurements recorded by the device.

This second aspect of the invention provides a portable sensing unit designed to be worn on a user's hand; the unit having a body; a stem which in use sits between two digits of the user's hand and a base connected to the stem which when in use is in contact with the machine causing vibrations; characterised in that the angle between the stem and the body is displaced from perpendicular.

Expressed another way the second aspect of the invention provides a portable unit designed to be worn on a user's hand; the unit having a body; a stem which in use sits between two digits of the user's hand and a base connected to the stem which when in use is in contact with the machine causing vibrations; characterised in that the angle between the stem and a contact plane associated with the body is displaced from perpendicular.

By utilising the second aspect of the invention, which may in one embodiment be used to measure and/or record the user's exposure to hand-arm vibration, the body tends to lie more uniformly against the user's hand and so is less susceptible to being affected by a glove. This purpose should be borne in mind when considering the angle between the body and the stem and in particular the contact plane associated with the body. The contact plane is the plane which passes through the points of the body which might normally make contact with the hand when in use. This plane is likely to coincide or be generally parallel with the surface of the hand onto which the body rests.

If the device has a generally cuboidal body with flat sides, the contact plane would normally correspond to the facet of the cuboid which makes contact with the hand. This may not hold true if the body has a more complex or irregular shape, such as being wedge shaped, having little or no symmetry, defining a number of curves and/or promontories. In such cases, the contact plane may not coincide with a particular facet but may instead pass through the points/surfaces which might reasonably be considered to make contact with the hand during use without a glove.

Similarly it is also important to consider the general direction of extension of the stem away from the body and not necessary just angle at the locality of the join between the two.

In a preferred embodiment of the second aspect of the invention, the angle between the stem and the body is displaced from perpendicular by $\theta$ being substantially around 5°. This causes the body to lie in its most flush position relative the user's hand. However, any change in the angle above 0° and up to 10° is thought to have a positive effect. Angles above 10° are thought to over compensate which results in a similar problem but in the other direction.

The angle is preferably achieved by altering the contact angle of the stem at the point of join with the body. However, it may also be achieved by altering the shape of the body, such as using a wedge shape or possibly by forming the stem into a curve.

BRIEF DESCRIPTION OF THE DRAWINGS

Embodiments of the invention will now be described by way of example with reference to the accompanying drawings in which:

FIG. 1 is a perspective view of a battery powered portable vibration sensor (a "dosimeter") constructed in accordance with the invention, with its top cover removed to reveal interior component and with its side wall shown partly broken away to reveal a battery;

FIG. 2 illustrates the sensor of FIG. 1 in use to sense vibration;

FIG. 3 is a perspective view of a docking station for receiving five sensors similar to that of FIG. 1;

FIG. 4 is a schematic diagram showing electronic processing functions and mechanisms forming part of the docking station and associated general purpose computer;

FIG. 5 illustrates the logic involved in selecting which dosimeter to activate next;

FIG. 6 is a cross section of a hand holding a vibration dosimeter of the prior art;

FIG. 7 is a perspective view of the underside of a dosimeter incorporating the invention;

FIG. 8 is a side view of the dosimeter of FIG. 7;

FIG. 9 is a front view of the dosimeter of FIG. 8;

FIG. 10 is a cross section of a hand holding a vibration dosimeter having an angled stem;

FIG. 11 is a cross section of a hand holding a vibration dosimeter having a more acutely angled stem;

FIG. 12 is a schematic view of a calibrator system;

FIG. 13 is perspective view, similar to FIG. 1, of a wireless free-standing sensor adapted to record hand arm vibrations;

FIG. 14 is a housing adapted to hold the sensor in two possible orientations during calibration;

FIGS. 15 and 16 are perspective views of the sensor mounted in the housing in two possible orientations;

FIG. 17 illustrates the processing steps for producing a record of vibration;

FIG. 18 illustrates the process steps during calibration; and

FIG. 19 shows the relationships between users and dosimeters.

DETAILED DESCRIPTION OF THE INVENTION

The illustrated system comprises a number of portable units of which one is shown in FIG. 1 and, shown in use, in FIG. 2. Each of these units is formed from a hollow plastics moulding defining a foot 1 that is designed to rest against a handle 2 of a vibrating machine when the handle is gripped by the user as shown in FIG. 2. Vibrations are transmitted from the foot 1, along a stem 3, which passes between the user's fingers, to a hollow main compartment 4 as seen from FIG. 1. The main compartment contains a circuit board 5 carrying conductors 7. After assembly of the circuit board 5, insertion of the board into the compartment 4, and fitting of a lid (not shown) through which the conductors 7 project, the compartment is filled with a settable resin so that just the tips of these conductors are exposed, thus forming contacts for charging and communication with a docking station to be described later. A number of different sizes and shapes of moulding are used so that different units will comfortably fit the hand of different users. The identifying feature of the different sizes is the length of the stem 3.

In addition to the contacts 7, the circuit board 5 carries a triaxial accelerometer 8, a processor 9, a warning lamp 10, a volatile memory module 11, a battery 12 and a timer 13. Also included but not shown is a read-only memory containing a unique identification number for the module which we shall refer to here as #i1, #i2 etc.

Referring now to FIG. 3, there is shown a docking station 14, the outer casing of which defines five identical bays or recesses configured so that each will receive any of the portable dosimeters. On the internal surface of these bays are formed electrical contacts (not shown) arranged to make electrical connection with the contacts 7 of the portable dosimeter units.

Alongside each bay is a set of three lamps 15. The first of these indicates the state of charge of the docked unit. It flashes when charging and is continuously on when fully charged. The second lamp indicates that data transfer is taking place. It flashes when data is downloading and illuminates continuously when the download is completed. The third lamp is illuminated to indicate an error.

On the top surface of the docking station is defined a keyboard 16 and a VDU 17. Within the casing of the docking station is a programmed central processing unit 18 and a battery charger 19. The processor 18 is linked via a standard telecommunications link 20 to a multipurpose computer 21 having a user interface 22, including a VDU and keyboard, for use by an administrator.

The CPU 18 and the computer 21 are programmed so that they form a processing mechanism that performs functions that will be described later. In addition, the computer 21 contains data as set out in Tables 1 and 2 (FIG. 19). Table 1 identifies (by PIN) each of four users currently in possession of a dosimeter and the identity number of the dosimeter assigned to them for a current work shift. Table 2 is a record of user preferred stem length. Whilst only four users are indicated in Table 2 for the purposes of illustration it will be appreciated that in a practical situation there are likely to be many more.

The charger 19 is designed to charge each docked dosimeter until it reaches full charge, after which it applies only a trickle charge current to the dosimeter. The dosimeter's processor 9 detects and distinguishes between a charging current above or below a defined "trickle" level. From this it can determine whether the battery is or is not fully charged, and can make this information available via the CPU 18 to the computer 21. The processor resets the timer 13 when a trickle charge is detected.

Operation of the system is as follows. Suppose that a user having ID 1342 requires use of a dosimeter. He enters his PIN number 1342 using the keyboard 16. This causes the CPU 18 to send to the computer 21: a) the user ID 1342; b) an indication of the identity of each of the dosimeters in the docking station; c) for each dosimeter, an indication of whether it is fully charged and d) for each dosimeter that is not fully charged an indication of the usage time since it was last fully charged.

The computer 21 is thus able to identify the dosimeters that are available and that are fully charged. By following the logic of FIG. 5, from these it selects at random one dosimeter that, from table 2, is known to fit the user. A message is displayed on the VDU display 17 of FIG. 3 showing user name and which dosimeter has been allocated. If there are no dosimeters at the docking station that are fully charged and fit the user, the information is displayed to an administrator via the user interface 22. The administrator is then able to select an available dosimeter that fits the user and that, whilst not fully charged, has been in use for only a short time since it was last fully charged.

The identity of the selected dosimeter is sent back to the CPU 18 which causes all three lamps adjacent the selected dosimeter to flash. The user then removes the selected dosimeter. The removal of the dosimeter from the docking station causes the timer 13 to start and the dosimeter lamb commences flashing once every four seconds to indicate it is activated. The removal of the dosimeter is notified to the computer 21 which updates Table 1.

If the wrong dosimeter is removed, it enters a minimum power mode for long term storage. The lamps on the docking station continue to flash. When a dosimeter in minimum power mode is restored to the docking station, it is accepted in the normal manner.

During use of the dosimeter, its processor 9 samples and filters the outputs of the triaxial accelerometer 8 at frequent intervals of many kilohertz. This data is processed in accordance with ISO 8041:2005 to produce second by second total RMS acceleration and running cumulative dosage value which are stored in module 11. In normal use, an LED lamp 10 flashes with a four second period to indicate that it is active and functioning. When the dosimeter's processor 9 detects that half the daily allowance of vibration has been reached, the lamp 10 is caused to illuminate as one flash per second. If and when the full maximum daily allowance is reached, this lamp 10 flashes at a higher rate of four times per second and the worker is required to stop work for the day.

There is another mode of use of the dosimeter lamp whereby it will rapidly triple flash on the occasion of there having been any overload during a one second period. The one second periods are consecutive and correspond to the one second period of processing that produces RMS acceleration values and dosage values on a second by second basis. Such information is recorded and is part of the information downloaded to the docking station when the dosimeter is docked after use.

After use, the worker returns the dosimeter to any free port of the docking station and this is detected by the CPU 18 which, in response, causes the dosimeter's processor 9 to freeze the content of the timer 13 and stops the LED lamp in its four second period cycle of flashing. It also reads the content of the memory 11 and the identification number of the dosimeter and the content of the timer 13 and passes this information to the computer 21 which updates table 1 accordingly. The computer records the identity of the user, the time period during which he has used the dosimeter and his exposure during that period to vibration. The record of vibration information is stored in a database associated with the corresponding user. This information can then be made available to regulatory authorities as evidence that the aforementioned Directive has been complied with. The second by second RMS acceleration values can also be used as a means of machine condition monitoring as any badly vibrating machine will be clearly evident from the data. For this purpose, the computer is programmed to compare a characteristic of each record of vibrational information with stored reference data defining characteristics that are known to be normal for properly functioning machines.

After return of a dosimeter to the docking station, the battery 12 in it immediately starts to charge and, when the processor 9 detects that the charging current has reduced to a trickle, indicating that the battery is fully charged, the processor causes the timer 13 to be set to zero.

The second aspect of the invention will now be described with reference to FIGS. 6 to 11 in which:

Referring firstly to FIGS. 2-4 there is shown a portable vibration sensor having a cuff link shaped outer casing defining a main body 2A and a foot 2C linked together by a stem 2B. The underside facet of the body 2A defines two shallow valleys 2D which correspond to the curvature of the fingers of a user.

The stem 2B is attached to the underside of the main body 2A at a point approximately mid way along the length of the body between the two valleys 2D, and substantially to one side. The stem 2B extends generally away from the body at an angle of 85° from the plane Y-Y (corresponding to 5° from perpendicular) which coincides with the flat surfaces not forming the valley 2D.

Housed within the main body 2A are means to measure and record hand-arm vibration including: a circuit board holding a digital processor; tri-axial accelerometer; means of filtering, digitising, storing and processing the signals to give a cumulative measure of vibrational dosage; a data store; a clock and a LED indicator for warning the operator when certain cumulative dosages have been reached. The LED also acts to indicates when the device is active and when it is overloaded by particularly strong vibrations. The body 2A also houses a number of contact pins 2E for use as communication channels and for charging of the battery. These pins 2E protrude from the top of the body 2A so as to enable contact with a docking station. The remaining space within the main body 2A is filled with polyurethane resin to facilitate the transmitting of vibrations from the operating machine to the accelerometers. The stem 2B and foot 2C are formed from a single solid piece of synthetic plastics material. This piece also defines the lower half of the main body 2A. The upper half of the main body 2A is formed from a second moulded piece which cooperates with the first piece forming the main body 2A. Further description of the workings of the dosimeter is considered to be beyond the ambit of this application.

In use the operator wears the dosimeter 2 as illustrated in FIG. 10 with the stem 2B lying between two fingers of the hand 3 so that the valleys 2D correspond to the tops of the adjacent figures (middle phalanges) between base knuckles 3A and middle knuckles 3B. Depending upon the length of the stem 2B, the body 2A may sit directly on the tops of the fingers or slightly above as shown in FIG. 10. In this embodiment, because the underside of the body 2A is generally flat, the contact plane generally corresponds with the underside surface of the body 2A (ignoring the valleys). Because the stem 2B is angled from the contact plane by 5° from perpendicular, the bottom surface of the body 2A particularly the point furthermost from the stem 2B, lies generally flush with the hand. With this arrangement any tendency for the body 2A to be pressed into the hand and rotated by a glove will be minimised and the foot 2C will maintain in full contact with the machine handle 4.

An alternative embodiment of the invention is illustrated in FIG. 11 wherein the main body 5A has an irregular shape. The stem 5B is joined to one portion of the main body at an angle of 90°. However, the angle between the stem 5B and the contact plane (X-X) of the body 5A is approximately 80°; $i.e.$ 10° from perpendicular and so the device will still sit flush onto the hand of the operator.

In either of the embodiments illustrated the angle between the stem and the contact plane may be varied within the range $0°<\theta\leqq10°$.

A third aspect of this invention relates to a method and device for calibrating accelerometers such as those for use in vibration sensors.

Vibration sensors are commonly used as a means to assess the vibration dosage to which operators of machinery are exposed. The importance of acquiring accurate readings has increased in recent years as a result of EU legislation which sets guide limits to protect workers from harmful effects of exposure to excessive vibration, such as 'white finger'.

A typical vibration sensor comprises three accelerometers which produce a voltage output proportional to acceleration to which they are subjected. The accelerometers record acceleration in all three axes of space and using these outputs it is possible to calculate frequency and amplitude of vibration and so calculate the dosage.

It is necessary upon manufacture and periodically during use for sensors to be calibrated so as to ensure that the readings they give are accurate. This has commonly been performed by mounting the sensor upon an electrodynamic shaker which produces a sinusoidal vibration having a known amplitude and a single known frequency along a single axis.

The frequency that may be produced using this method is dependent upon the size of the shaker. Lower frequencies require a larger displacement which requires a larger shaker. Devices using this method to recreate very low frequencies, such as 12 Hz, require a device of significant size which for many applications makes their use impracticable. Consequently, most portable devices of this type operate at a relatively high frequency, usually in the region of 160 Hz. Additionally, because the device only operates along one axis, it is necessary to re-orientate the sensor and repeat the test twice so that the accelerometers associated with each of the three axes can be calibrated.

An alternative calibration method employs the technique of measuring the output of a stationary sensor which should equate to the acceleration due to gravity (1 g). The sensor is then inverted and the output measured again. The second measurement should equate to an equal and opposite acceleration i.e. −1 g. The sensor can then be calibrated according to the output given in these two static positions.

The aforementioned methods calibrate the sensor at either a single frequency of vibration or in a stationary state. However, sensor outputs are known to vary when considered over a wide range of frequencies and this brings with it the problem that if the calibration frequency and operating frequency are very different, calibration may not ensure that the sensor is producing accurate readings at the operating frequency. Additionally, the stationary method will only work for sensors whose frequency response extends down to zero.

Consequently, there is a desire for a calibrator able to calibrate a sensor at any frequency or range of frequencies chosen by the user, which is currently not possible using the methods previously described.

The third aspect of the invention provides a method of calibrating an accelerometer at a specified frequency in which the accelerometer is rotated at that frequency about an axis so that gravitational force is applied alternatively in opposite directions to the accelerometer.

The third aspect of the invention allows vibration sensors to be calibrated at any frequency or through a range of frequencies. It is particularly suited for the calibration of vibration sensors operating without connecting wires which would otherwise become tangled when rotated.

In a preferred embodiment rotation such as that the accelerometer experiences sinusoidally varying acceleration. Preferably the rotation angle is 360° and is rotated continuously such as to have a substantially constant angular velocity corresponding to the specified frequency.

In a preferred embodiment the method uses a frequency control mechanism to control the frequency of rotation whilst the accelerometer is rotating and to alter it if required.

A calibrating mechanism may be included to calibrate output values from the accelerometer by comparison with an expected value at the specified frequency and to determine a scalar to be applied to the output value so that the output value and expected value match.

Before and after calibration, the sensor may be placed in a docking station to communicate scaling information to the sensor and/or to receive calibration data from the sensor.

The third aspect of the invention may also be described in terms of apparatus and so there is provided a calibrator for calibrating an accelerometer at a specified frequency comprising means to rotate the accelerometer at that frequency about an axis so that gravitational force is applied alternatively in opposite directions to the accelerometer.

It is preferred that the accelerometer be rotated such that the accelerometer experiences sinusoidally-varying acceleration. This maybe achieved by rotating continuously through an angle of 360° such that it has a substantially constant angular velocity corresponding to the specified frequency.

In a preferred embodiment the calibrator forms part of a calibrating system having a docking station adapted to receive the vibration sensor; to communicate scaling information to the sensor and/or to receive calibration data from the sensor.

The preferred embodiment may also comprise means to allow a user to select a frequency for calibration.

It can be advantageous for the calibration system to include means to determine an expected output value at the selected frequency; means to compare the expected output value with an actual output value of the accelerometer and means to determine a scalar to be applied to the actual output value so that the expected output value and actual output value equate.

The third aspect of the invention may be expressed another way as a calibrating system comprising a calibrator and a docking station incorporating a calibration mechanism.

A preferred embodiment of the above system comprises means to allow a user to select a frequency for calibration and means to determine the expected output value at the selected frequency. Preferably this is determined using a user input value of the height above sea level of the calibrator.

An embodiment of the third aspect of the invention will now be described by way of example with reference to FIGS. 12 to 16

There is shown in FIG. 12 a calibrator 1 mounted on a flat base 2. A variable speed electric motor 3 is supported on the base 2 by a mount 4 formed from two blocks of metal 4A and rubber damper 4B. The motor 3 is supported onto the mount 4 by way of an 'L' shaped metal bracket 5 secured to the mount 4 by way of nylon screws.

The output shaft of the electric motor 3 is connected to a series of gears 6 through to a transmission shaft 6A.

A circular plate 7 is mounted on a substantially horizontal axle 8 which is supported by a bearing block 9 on the platform 2 such that the circular plate is free to rotate about axle 8 above the base 2. The axle 8 is connected to the output shaft from the gears 6 via an anti-vibration coupler 10 which also accommodates any misalignment of the two shafts.

Also mounted on the base 2 is a docking station 15 having a dock 15A shaped to house a sensor with contacts 15D for connection to a processing mechanism shown schematically as 15B. The docking station 15 further comprises a user interface 15C which enables the processing mechanism 15B to request and receive from a user certain parameters relating to the calibration. The processing mechanism 15B has a wired connection 16 to the electric motor 3. The wired connection 16 allows the motor 3 to be commanded to rotate at a frequency in revolutions per second specified by the user via the interface 15C. The motor 3 may be either a stepper motor incorporating a speed controller or a conventional motor incorporating a rotation sensor and a feedback mechanism to ensure that its speed of rotation is the same as the frequency commanded by the user.

FIG. 13 illustrates a wireless sensor 16 adapted to be worn on the hand of a machine operator. The outer casing defines a main body 16A, stem 16B designed to sit between the fingers of a user and a foot 16C which rests against the handle of the machine being operated. Protruding from the main body 16A are contacts 16D adapted for connection to the docking station contacts 15D to allow communication to processor mechanism 15B.

Inside the housing the sensor contains a tri-axial accelerometer 20, a processing unit 22 and memory 23. The operation of these will be explained in greater detail below.

FIG. 14 illustrates a housing 11 supported by the plate 7 for holding a sensor during calibration. The housing 11 defines a recess 11A shaped so that the sensor can be held in either of two orientations both of which are central of the plate 7 and axle 8 as shown in FIGS. 3A and 3B. In the first orientation, the stem 16B lies co-axially with axle 8 whereas in the second orientation the stem 16B lies normal to the axle 8. A retaining door 12 is pivotally mounted onto the housing 11 and can be secured in a closed position to hold the sensor 16 during rotation. The door is retained in the closed position by magnets 13 and 14 affixed to the door 12 and housing 11.

Referring now to the internal mechanisms of the sensor 16, during normal use, i.e.

when not being calibrated, the sensor functions as illustrated in FIG. 17. Voltage outputs from an accelerometer 20 are converted by the analogue-digital converter (ADC) 21 into a digital signal which is processed by the CPU 22 and the resulting data stored in memory 23. This data can be used to produce a total vibration exposure value used to monitor the wearer's cumulative exposure to vibrations.

The processing steps of the CPU 22 are also illustrated. The incoming signal from the ADC 21 is passed through a filter 30 which filters the signals according to a suitable frequency weighting curve. The output of the filter 30 is then passed through a scaling circuit 31 which applies a scale coefficient derived from values stored in non-volatile memory 32. The mean square of all the scaled value outputs per second are then calculated by calculating mechanism 33 and each of these values are stored in the memory 23.

Filtering/weighting is used to account for the fact that certain frequencies of vibration cause greater harm to a machine operator than others. Frequencies of detected vibration which occur near or in the known harmful range(s) of frequencies will be weighted more than frequencies occurring further away from the range. In the case of a sensor measuring hand arm vibration, it is known that the most harmful vibrations occur at around 11.5 Hz thus vibrations detected near this frequency will be most heavily weighted.

A scaling coefficient is applied to the signal as a means to compensate for differences in sensitivity between accelerometers 20 so as to ensure the overall accuracy of the sensor 16. There will be an individual scaling coefficient for each accelerometer within the sensor.

The docking station 16 also comprises a calibrating mechanism 40, illustrated in FIG. 18, comprising a comparator 41, a scale calibrator 43 and a memory 42 holding the expected mean squared value per second at a frequency specified by the user. This value is calculated using the local value of the acceleration of gravity itself calculated from imputed data of the height above sea level by the user via user interface 15C. When the sensor is not being calibrated the calibrating mechanism 40 resides in an 'off-mode'.

When the sensor 16 is to be calibrated, it is first placed in the dock 15A such that contacts 16D make contact with contacts 15D. This enables the processing mechanism 15B to recognise the presence of the sensor 16 and request from a user, via user interface 15C, the frequency at which calibration is to take place and the height above sea level of the calibrator. The user inputs this data through user interface 15C and the processor 15B calculates an expected mean square sensor output value for the specified frequency which is stored in memory 42.

The calibrator then calibrates each of the three axes of the sensor in turn, these axes to be referred to as X Y and Z. It first downloads a unit (1) scaling coefficient for the X axis and zero (0) for the Y and Z axes to the non-volatile memory 32 of the sensor. The user is informed via user interface 15C that the sensor X axis is ready to be calibrated whereupon the sensor 16 can be removed from the docking station 15 and secured in a first orientation in the housing 11 of FIG. 15 with its X axis normal to the axle 8 (i.e. the axis of rotation). The user then instructs calibration to start via user interface 15C upon which the processor 15D instructs to the motor 3 to rotate so as to cause the plate 7 to rotate at a rate of the user's inputted frequency (e.g. 11.5 revolutions per second).

Rotation of the plate 7 at a constant angular frequency (for example 12 revolutions per second) causes the X axis accelerometer to undergo a sinusoidally-varying acceleration peaking between +1 g and −1 g during each turn of the accelerometer. Where g is the acceleration due to gravity at the location of the calibrator. This is the same acceleration that it would experience on a conventional shaker-driven calibrator operating at the same frequency and amplitude. In addition the X axis accelerometer may experience a constant centripetal acceleration if the accelerometer is not located on the rotation axis 8 but any such constant acceleration is to be ignored. As the Y axis accelerometer is also orientated normal to axle 8 it will also be subjected to the same sinusoidally varying acceleration; however, all values outputted by this accelerometer will be ignored as a result of the applied zero value scaling coefficient.

After the sensor has been rotating at constant speed for a time of order 30 seconds the motor stops spinning. The user removes the sensor from the holder 11 and returns it to the dock 15. The docking station uploads the 1-second mean square acceleration values to memory 42, discarding those corresponding to the periods of run-up and run-down of the motor 3. This maybe done by ignoring the first and last few second's worth of data. It next downloads a scaling coefficient of 1 for the Y axis and 0 for the X and Z axes to the non-volatile memory 32 of the sensor. The user is informed via user interface 15C that the sensor Y axis is ready to be calibrated whereupon the sensor 16 can be removed from the docking station 15 and secured in the housing 11 of FIG. 3A with its Y axis normal to the axis of rotation 8. This orientation may be the same as it was for X axis calibration. The user then instructs calibration to start via user interface 15C upon which the processor 15D instructs to the motor 3 to rotate so as to cause the plate 7 to rotate at a rate of the user's inputted frequency (e.g. 12 revolutions per second).

This procedure is repeated a third time to calibrate the Z axis: the sensor is secured in the orientation illustrated in FIG. 3B so that the Z axis is normal to axle 8; the actions taken for the Y axis in the preceding paragraph are now repeated for the Z axis.

At the end of this procedure the sensor is again docked and the comparator 41 within the processing mechanism 15B compares the mean square values stored in 44 for the X, Y and Z accelerometers in turn and compares these with the expected mean square value held in memory 42. The difference between the compared values is sent to the scale calibrator 43 which formulates new calibration coefficient needed to obtain an output corresponding to 1 g peak sinusoidal acceleration at the calibration frequency. The three new coefficients for the respective accelerometers are uploaded to the sensor's non-volatile memory 32.

In an alternative embodiment the docking station may also transmit the new coefficient values to a PC which stores previous calibration coefficient associated with the sensor including the first ever coefficient value. The PC can then be used to signal upon a deviation by more than 10% from the original value indicating that the sensor should be replaced.

It will be understood that the frequency chosen to calibrate the sensor will depend on the most common or most significant frequencies which the sensor is expected to encounter.

In an alternative embodiment, the calibrator may be adapted so that the plate 7 rotates in two stages of 180° each. Or in a further embodiment rotates about 180° before rotating back by 180° in the opposite direction.

In a more complex embodiment, the calibrator may be adapted so as to vary the frequency of rotation during the calibration through a range specified by the user. In such an embodiment the sensor will record the 1-second mean square values which can then be downloaded to a PC and considered relative to an expected range of values throughout the specified frequency range.

Possible variations to the designs that have been described include:

a) The sensed data could be transmitted wirelessly from the dosimeter during use to the docking station.

b) The data could be transmitted wirelessly from the docked dosimeter to the docking station instead of using contacts 7 c) The dosimeter, instead if measuring vibration dose in terms of root mean square acceleration, could measure peak acceleration in successive time periods, each second for example; or peak velocity.

Although the described examples of the invention are directed towards a hand-arm vibration sensor, it is envisaged that the invention could be equally applicable to any sensor designed to be carried between the fingers of a user's hand. Alternative sensors may be used to record temperature; exposure to gases, chemicals, particulates, noise etc.

The invention claimed is:

1. A system for monitoring the exposure of users of vibrating equipment to vibration comprising:
    a) battery powered portable units designed to fit on the hands of users and to record information concerning the exposure of the users to vibration;
    b) a docking station designed to receive the portable units before and after use, to receive information recorded by or stored within the units, to charge the batteries and to receive identity information concerning a worker requesting access to a unit; and
    c) a processing mechanism associated with the docking station and arranged and programmed (i) to receive the said identity information and information concerning the state of charge of the batteries, (ii) to inform a user about to start work which unit to take and (iii) to record which worker has or has had which dosimeter.

2. A system according to claim 1 wherein the docking station and associated processing mechanism includes means for deriving an indication of the state of charge of unit held by the docking station; and the processing mechanism holds identity information of users authorised to use the portable unit; the processing mechanism being programmed to perform step (ii) by performing a logical operation dependant on the identity of the user, and the state-of-charge information.

3. A system according to claim 2 wherein the means for deriving an indication of the state of charge includes a) means for sensing that a unit is fully charged and b) means for sensing an indication of a usage time of a unit after being fully charged.

4. A system according to claim 1 wherein different portable units have different sizes and or shapes for fitting different users and in which the processing mechanism holds hand-fit information defining which units fit which users, the processing mechanism being programmed to carry out step (ii) by performing a logical operation dependent on the identity of the user and the hand-fit information.

5. A system according to any claim 1 wherein each portable unit comprises an outer housing containing an electronic circuit and a settable potting compound, the circuit having electrical conductors that project outside the surface of the potting compound to define contacts, the docking station having corresponding contacts positioned to mate with the contacts of the portable unit.

6. A system according to claim 1 wherein the portable units are hand-held for monitoring the exposure of users to hand-arm vibration.

7. A system according to claim 1 wherein the portable units are adapted to fit between the fingers of a user.

8. A docking station for use in a system constructed according to claim 1 wherein the portable units are designed to fit on a piece of vibrating equipment.

9. A monitoring system comprising:
    a) battery powered portable units designed to record information concerning a user and/or to make a measurement at a location of the user
    b) a docking station designed to receive the portable units before and after use, to receive information recorded by or stored within the units, to charge the batteries and to receive identity information concerning a worker requesting access to a unit; and
    c) a processing mechanism associated with the docking station and arranged and programmed (i) to receive the said identity information and information concerning the state of charge of the batteries, (ii) to inform a user about to start work which unit to take and (iii) to record which worker has or has had which unit.

* * * * *